Patented June 23, 1936

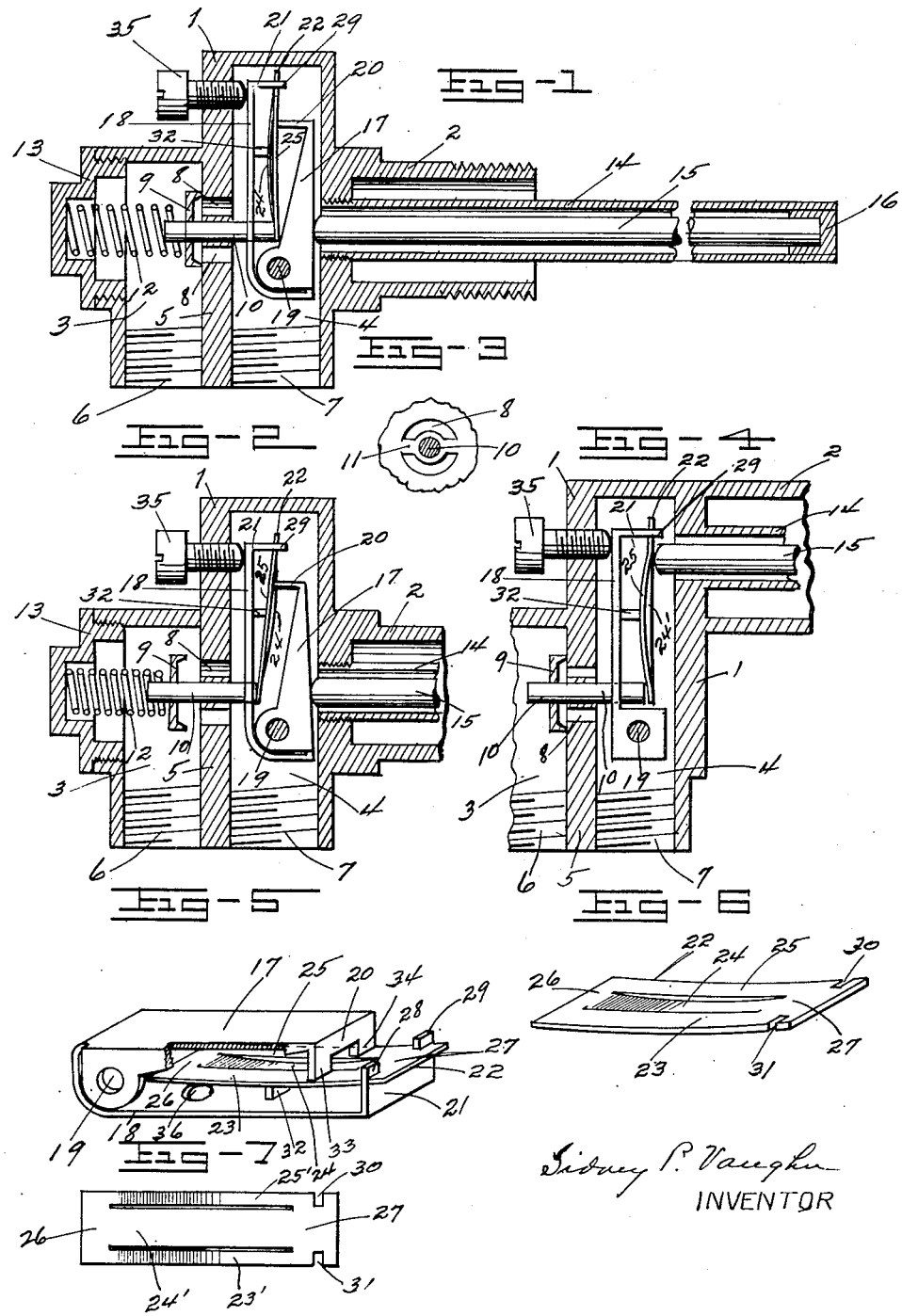

2,044,822

UNITED STATES PATENT OFFICE 2,044,822

THERMOSTATIC SNAP ACTION VALVE

Sidney P. Vaughn, United States Navy, Ackerman, Miss.

Application April 14, 1932, Serial No. 605,262

17 Claims. (Cl. 236—48)

(Granted under the act of March 3, 1883, as amended April 30, 1928; 370 O. G. 757)

I agree that the invention may be manufactured and used by or for the Government for governmental purposes without the payment to me of any royalty thereon.

This invention relates to snap action devices in general, but more particularly to thermostatically actuated snap action devices adapted to operate valves and electric switches used to control the temperature of hot water heaters, ovens, etc. While I am describing the invention as adapted to thermostatic valves for hot water heaters, it will be understood that the snap action device is adapted to many uses besides those described herein.

The principal object of my invention is to provide an extremely simple, compact, economical and reliable snap action device particularly adapted for opening and closing valves and switches with a snap action.

Another object of my invention is to provide a snap action device having a much greater movement than snap action devices employing the snap disk or diaphragm to operate a valve the movement of which is limited generally by the distance the center of the disk or diaphragm moves in snapping into a reverse form.

Another object of this invention is to provide a snap action device adapted to cumulate energy and release energy sufficient to suddenly and completely open a valve or switch with a snap action and to allow the valve or switch to close with a snap action when the force creating the energy is removed.

Another object is to provide a simple method of regulating the snap action of the device when actuated by means movable according to temperature variation.

The foregoing, together with such other objects as may hereinafter appear, or, are incident to my invention, I obtain by means of a construction described herein and illustrated in one preferred form of thermostatic snap action valve in the accompanying drawing wherein:

Fig. 1 is a central longitudinal section through a thermostatic snap action valve for hot water heaters made in accordance with my invention and shows the position of the snap action device when the valve is closed.

Fig. 2 is the same as Fig. 1 except that it shows the position of the snap action device when the valve is open.

Fig. 3 is a plan view of the valve stem guide.

Fig. 4 is a central longitudinal section through a modified form of thermostatic snap action valve.

Fig. 5 is a perspective view of the snap action device embodied in Figs. 1 and 2.

Fig. 6 is a perspective view of a snap action lever embodied in the snap action device.

Fig. 7 is a plan view of a modified form of snap action lever embodied in Fig. 4.

Like numerals refer to like parts throughout the several views.

Referring to the drawing the thermostatic snap action valve embodies a body 1 having an externally threaded plug 2 adapted to screw into a tank or other container containing a fluid to be heated. The valve body is divided into two chambers 3 and 4 by a partition wall 5. The chamber 3 has an internally threaded inlet 6 which is connected to a gaseous fuel supply, and the chamber 4 has an internally threaded outlet 7 which is connected to the burner used to heat the fluid in the tank. Communication is established between the inlet and outlet side of the valve body by means of openings 8 formed in the partition wall 5 which are opened and closed by a valve member 9 carried by a stem 10 movable in a valve stem guide 11 formed in the partition 5. The valve assembly is arranged concentrically with the plug 2 and the valve is normally held seated by a helical spring 12 which engages the valve and is supported in the bore of a removable cap 13 threaded into the valve body concentrically with the valve.

The plug 2 carries the usual thermostatic elements which extend in the fluid to be heated. In this case the thermostatic element comprises a tube 14, preferably a copper tube or other tube having a high coefficient of expansion, screwed at one end into the plug with its free end extending into the fluid to be heated, and a rod of invar 15, or other material having a low coefficient of expansion, passing through the tube 14 with one end secured in a water tight plug 16 in the free end of the tube 14, and the other end extending into the valve body outlet side. The thermostatic elements are preferably disposed concentrically in relation to the valve assembly in order to obtain a more compact assembly, altho they may be arranged as illustrated in Fig. 4. It is evident that expansion and contraction of the copper tube 14 results in endwise movement of the free end of the invar rod 15.

The endwise movement of the free end of the invar rod is amplified and utilized to open and close the valve 9 with a quick action through the intermediary of a compound snap action lever system (see Fig. 5) suitably disposed between the end of the invar rod 15 and the end of the valve stem 10. The lever system forms the basis of this invention and comprises a relatively stiff flat lever 17 of the third class actuated by the free end of the invar rod, and a relatively resilient flat lever 18 of the third class, both of which have a common fulcrum and are supported in the outlet side of the valve body by a pin 19. The fulcrum end of the levers are connected and the two might be considered a U shaped lever with the fulcrum in the base of the U. While I prefer this form of construction, the two levers may be separated. The free end 20 of the stiff lever 17 is bent toward the resilient lever 18 and the free end 21 of the resilient lever is bent toward the stiff lever 17, but the bent ends are so spaced that the stiff lever is the shorter of the two. The free end of the resilient lever forms the fulcrum of what may be considered as a snap action third class lever 22, that is a lever that is restrained against movement and will not move except with a snap action. The snap action lever has a form similar to that illustrated in Fig. 6, and comprises a plate of spring metal or other suitable material, slotted lengthwise to form three bowed strips 23, 24 and 25, connected at their ends by cross members 26 and 27. The middle strip 24 has a greater degree of bow than the side members 23 and 25. When sufficient pressure is exerted at opposite points on the concave side of the outside strips 23 and 25 or on the end members 26 and 27, and this pressure is resiliently resisted at a point on the convex side of the middle strip 24, the middle strip will snap suddenly into a reverse form and the side strips will become straight. If the degree of bow of the middle strip is not too great, it will snap back to its original form when the pressure is removed. This property is accentuated by having the outside strips normally slightly bowed in the same direction as the normal bow of the middle strip 24. In the stamping process, if the middle strip only is bowed the outside strips will automatically take a slight bow by virtue of the strains set up in the metal. While I prefer the outside strips slightly bowed, they may be made straight and a fair snap action obtained.

The snap action lever 22 is pivoted at one end 27 on the bent end 21 of the resilient lever 18 and is held in this pivoted position by projecting lugs 28 and 29 extending from the bent end which engage slots 30 and 31 formed in the side edges of the lever 22. The free end of the snap action lever 22 makes contact with the end of the valve stem 10. A lug 32 is formed in the resilient lever 18 which makes contact with the convex side of the bowed middle strip 24 of the snap action lever. The stiff lever 17 has depending lugs 33 and 34 which engage the normally concave side of the side strips 23 and 25 of the snap action lever 22 between the fulcrum and the lug 32. Thus it will be seen that the snap action lever 22 is held securely on its fulcrum and between the stiff lever and the resilient lever, and that any pressure exerted by the stiff lever 17 on the snap action lever 22 will have a tendency to force the free end of the snap action lever toward the valve stem. The free end of the resilient lever 18 is restrained from movement toward the valve side of the body by an adjustment screw 35 which is provided to adjust the relation between the lever system and the end of the invar rod 15.

In operation, assume that the copper tube 14 contracts due to lowering of temperature. The free end of the invar rod 15 will exert a pressure on the stiff lever 17 which is transmitted to the snap action lever 22. The movement of the snap action lever is resisted by the lug 32 pressing against the normally convex side of the snap action lever middle strip. The resilient lever will give slightly but when the pressure is sufficient, the middle strip of the snap action lever will snap suddenly into a reverse form, permitting the free end of the snap action lever to press against the valve stem and open the valve with a snap action, as illustrated in Fig. 2. When the copper tube 14 expands due to a rise in temperature, the pressure on the lever system will be reduced and the snap action lever will regain its normal form and permit the valve to close with a snap action as illustrated in Fig. 1. The degree of amplification of the end movement of the invar rod may be varied by varying the distance between the fulcrums and the points of force in the lever system.

In Fig. 4 is shown a modified form of construction in which the stiff lever 17 is eliminated. The invar rod 15 makes direct contact with the middle strip 24' of the snap action lever 22' between the fulcrum and the load point or the lug 32 on the resilient lever 18. The type of snap action lever used in this modification is illustrated in Fig. 7, in which the side strips 23' and 25' have the greater degree of bow. The invar rod presses against the strip 24' and the force tends to rock the lever toward the valve stem, but the pressure is restrained by two lugs 32 pressing against the normally convex side of the side strips 23' and 25'. When the pressure or force is sufficient, the strips 23' and 25' will snap suddenly into a reverse form, permitting the movement of the lever which opens the valve.

While I have shown the snap action device as operating a valve, the same principle may be used in operating an electric contact by substituting an electric contact for the valve. Also the snap action device may be operated by any other form of thermostatic device, or by hand if desired.

It is believed that the foregoing description conveys a clear understanding of the objects and advantages of my invention. All legitimate modifications and applications of my invention are therefore to be construed as coming within the scope and spirit of the appended claims.

I claim:

1. In a snap action device, the combination of a snap action element comprising a bowed elongated piece of flat spring material having one or more longitudinal slots provided therein defining separate ribs, the piece being formed so as to cause the same to assume normally a buckled position by reason of the relationship of the ribs to each other, means for supporting said element at one end, means providing an abutment for said element intermediate the ends, a device to be operated with snap action disposed for engagement by the other end of said element so as to be moved thereby in the snap action thereof, and a thermostat movable in accordance with temperature change and disposed so as to exert a flexing force on said element between the supported end and the abutment.

2. In a snap action device, the combination of a snap action element comprising a bowed elongated piece of flat spring material having one or more longitudinal slots provided therein defining separate ribs, the piece being formed so as to cause the same to assume normally a buckled position by reason of the relationship of the ribs to each other, a holder for said element whereon the same is fulcrumed at one end, an abutment for said element on said holder having engagement with the element in longitudinally spaced relation to the fulcrum, a device to be operated abruptly disposed so as to be moved by the other end of said element in the snap action thereof, and a thermostat movable in accordance with temperature change disposed so as to apply pressure to the element between its fulcrum and abutment to force the same over dead center.

3. In a snap action device, the combination of a snap action element comprising a bowed elongated piece of flat spring material having one or more longitudinal slots provided therein defining separate ribs, the piece being formed so as to cause the same to assume normally a buckled position by reason of the relationship of the ribs to each other, a casing, a holder for said element pivotally mounted in said casing, said element being fulcrumed at one end on said holder for oscillatory movement in the snap action thereof, a screw adjustment for said holder to shift the same relative to the casing and accordingly change the position of the fulcrum, an abutment on said holder for said element engaging the latter in longitudinally spaced relation to the fulcrum, a thermostat movable relative to the casing in accordance with temperature change, a movement amplifying lever pivoted with the holder and movable with the thermostat, said lever having the free end communicating pressure to said element between the fulcrum and the abutment to force the element toward and past dead center, and a device to be operated abruptly disposed for movement with the free end of said element in the snap action thereof.

4. In a snap action device, the combination of a snap action element comprising a bowed elongated piece of flat spring material having one or more longitudinal slots provided therein defining separate ribs, the piece being formed so as to cause the same to assume normally a buckled position by reason of the relationship of the ribs to each other, a casing, a holder for said element pivotally mounted in said casing, said element being fulcrumed at one end on said holder for oscillatory movement in the snap action thereof, a screw adjustment for said holder to shift the same relative to the casing and accordingly change the position of the fulcrum, an abutment on said holder for said element engaging the latter in longitudinally spaced relation to the fulcrum, a thermostat movable relative to the casing in accordance with temperature change, said thermostat transmitting pressure to said element between the fulcrum and abutment to move the element toward and past dead center for snap action thereof, and a device to be operated abruptly disposed for movement with the free end of said element in the snap action thereof.

5. In a thermostatic device of the character described, the combination of a casing, a thermostat comprising a tube rigid with the casing and a rod therein projecting into the casing and movable according to temperature change, a valve in said casing in substantially concentric relation to the thermostat, and means in said casing between the rod and valve dependent for operation upon the movement of said rod to give amplified abrupt movement to the valve, said means comprising an elongated buckled snap action element normally buckled in one direction but arranged when forced past dead center to buckle in the reverse direction, said element being disposed with the working end between the thermostatic rod and valve and engaging the latter to move the same, means providing a fulcrum in said casing for the other end of said element, means providing an abutment for said element in said casing in longitudinally spaced relation to the fulcrum, and a movement amplifying lever pivotally mounted at one end in said casing and extending past the inner end of said thermostatic rod and having the remote end engaging said element between the fulcrum and abutment, whereby in a given movement of the thermostatic rod said lever communicates amplified movement to said element sufficient to force the same past dead center for snap action thereof.

6. A device as set forth in claim 5 wherein the means providing the fulcrum and the means providing the abutement are included on a holder for said element pivotally mounted in said casing, the fulcrum being at the movable end of said holder and the abutment inwardly spaced with relation thereto, said device including a screw adjustment for said holder for shifting the latter relative to the casing so as to adjust the fulcrum and abutment relative to the thermostat.

7. In a device of the character described, the combination with a thermostat movable according to temperature change and a device to be operated abruptly in a predetermined movement of said thermostat, of a snap action element for communicating movement to said device, the same comprising a bowed elongated piece of flat spring material having longitudinal slots provided therein defining a central rib and a pair of opposed side ribs, the piece being bowed with the central rib defining an arc of shorter radius than the side ribs, a holder supporting said snap action element at one end for oscillatory movement, an abutment on the holder engaging the central rib in longitudinally spaced relation to the supported end, and a movement amplifying lever moved by the thermostat and having engagement with the snap action element on the opposed side ribs at a point between the supported end of the element and the aforesaid abutment, whereby to force the element toward and past dead center in a predetermined movement of the thermostat to cause snap action of the element.

8. In a snap action device, a snap action element comprising a bowed elongated piece of flat spring material having longitudinal slots provided therein defining a central rib and a pair of opposed side ribs, the piece being bowed with the central rib defining an arc of shorter radius than the side ribs, a holder supporting said snap action element at one end for oscillatory movement, an abutment on the holder engaging the central rib in longitudinally spaced relation to the supported end, and a movement amplifying lever having engagement with the snap action element on the opposed side ribs at a point between the supported end of the element and the aforesaid abutment, whereby to force the element toward and past dead center in a predetermined movement of the lever to cause snap action of the element.

9. In a thermostatic device, the combination of a casing, a thermostat movable relative to the casing according to temperature change, an elongated snap action element fulcrumed on one end in said casing for oscillatory movement, the same having a bulged portion normally bulged in one direction but arranged to be forced toward and past dead center so as to snap over to a reverse bulge, the free end of said element having abrupt movement in the snap action of the element, a valve or other device operable by the free end of said element, an abutment in said casing having engagement with the bulged portion of the snap action element at a point longitudinally spaced from the fulcrum end to support the same for the exertion of pressure on said element to force the same over dead center, said element having such pressure applied thereto by the thermostat between said fulcrum and abutment, and screw threaded means for adjusting the fulcrum for said snap action element toward or away from the movable thermostat whereby in a small adjustment to advance or retard as desired the snap action of the element with relation to the movement of said thermostat.

10. In a snap action device, the combination of an elongated buckled snap action element normally buckled in one direction but arranged when forced past dead center to buckle in the reverse direction, a casing, a holder for said element pivotally mounted in said casing, said element being fulcrumed at one end on said holder for oscillatory movement in the snap action thereof, a screw adjustment for said holder to shift the same relative to the casing and accordingly change the position of the fulcrum, an abutment on said holder for said element engaging the latter in longitudinally spaced relation to the fulcrum, a thermostat movable relative to the casing in accordance with temperature change, a movement amplifying lever pivoted with respect to the holder and movable with the thermostat, said lever having the free end communicating pressure to said element between the fulcrum and the abutment to force the element toward and past dead center, and a device to be operated abruptly disposed for movement with the free end of said element in the snap action thereof.

11. In a snap action device, the combination of an elongated buckled snap action element normally buckled in one direction but arranged when forced past dead center to buckle in the reverse direction, a casing, a holder for said element pivotally mounted in said casing, said element being fulcrumed at one end on said holder for oscillatory movement in the snap action thereof, a screw adjustment for said holder to shift the same relative to the casing and accordingly change the position of the fulcrum, an abutment on said holder for said element engaging the latter in longitudinally spaced relation to the fulcrum, a thermostat movable relative to the casing in accordance with temperature change, said thermostat transmitting pressure to said element between the fulcrum and abutment to move the element toward and past dead center for snap action thereof, and a device to be operated abruptly disposed for movement with the free end of said element in the snap action thereof.

12. In a device of the character described, the combination with a thermostat movable according to temperature change and a device to be operated abruptly in a predetermined movement of said thermostat, of a snap action element for communicating movement to said device, the same comprising a bowed elongated piece of flat spring material having longitudinal slots provided therein defining a central rib and a pair of opposed side ribs, the piece being bowed so that the central rib defines an arc of a different radius from that of the side ribs, a holder supporting the snap action element at one end for oscillatory movement and having a rib engaging abutment thereon in longitudinally spaced relation to the supported end of the element, and a movement amplifying lever moved by the thermostat and having another rib engaging abutment in a different longitudinally spaced relation to the supported end of the element, whereby to force the element toward and past dead center in a predetermined movement of the thermostat to cause snap action thereof.

13. In a snap action device, a snap action element comprising a bowed elongated piece of flat spring material having longitudinal slots provided therein defining a central rib and a pair of opposed side ribs, the piece being bowed so that the central rib defines an arc of a different radius from that of the side ribs, a holder supporting said snap action element at one end for oscillatory movement and having a rib engaging abutment thereon in longitudinally spaced relation to the supported end of said element, and a movement amplifying lever having another rib engaging abutment in a different longitudinally spaced relation to the supported end of the element, whereby to force the element toward and past dead center in a predetermined movement of the lever to caus snap action of the element.

14. In a snap action device, the combination of a casing, a pair of laterally spaced abutments both adjustable in the same direction, an elongated member carrying a bulged snap action spring part normally bulged in one direction but arranged to be forced past dead center to snap to a reverse bulge, said member being fulcrumed at one end on one of said abutments and having the bulged spring part disposed adjacent the other abutment for the application of pressure on the bulge by the abutment when the member is forcibly oscillated, thermostatic means movable in the opposite direction to the adjustment of said abutments toward the member between the two abutments and close to the first abutment to forcibly oscillate the member, a valve operable by the free end of said member and arranged to be moved in one direction when the bulge of the spring part is snapped over dead center to a reverse bulge, and spring means normally tending to move the valve in the other direction.

15. In a device of the character described, the combination with a thermostat movable according to temperature change and a device to be operated abruptly in a predetermined movement of said thermostat, of a snap action element for communicating movement to said device, the same comprising a bowed elongated piece of flat spring material having longitudinal slots provided therein defining a central rib and a pair of opposed side ribs, the piece being bowed so that the central rib defines an arc of a different radius from that of the side ribs, a holder supporting the snap action element at one end for oscillatory movement and having a rib engaging abutment thereon in longitudinally spaced relation to the supported end of the element, and another rib-engaging abutment in a different longitudinally spaced relation to the supported end of the element and movable with the thermostat whereby to force the element toward and past dead center in a predetermined movement of the thermostat to cause snap action thereof.

16. In a snap action device, a snap action element comprising a bowed elongated piece of flat spring material having longitudinal slots provided therein defining a central rib and a pair of opposed side ribs, the piece being bowed so that the central rib defines an arc of a different radius from that of the side ribs, a holder supporting said snap action element at one end for oscillatory movement and having a rib engaging abutment thereon in longitudinally spaced relation to the supported end of said element, and another rib engaging abutment in a different longitudinally spaced relation to the supported end of the element and movable toward the element whereby to force the element toward and past dead center in a predetermined movement of said abutment to cause snap action of the element.

17. In a snap action device, a snap action element comprising a bowed elongated piece of flat spring material having longitudinal slots provided therein defining a central rib and a pair of opposed side ribs, the piece being bowed with the central rib defining an arc of shorter radius than the side ribs, a holder supporting said snap action element at one end for oscillatory movement, an abutment on the holder engaging the central rib in longitudinally spaced relation to the supported end, and another rib-engaging abutment in a different longitudinally spaced relation to the supported end of the element and movable with the thermostat whereby to force the element toward and past dead center in a predetermined movement of the thermostat to cause snap action thereof.

SIDNEY P. VAUGHN.